United States Patent
Chen et al.

(10) Patent No.: US 8,106,611 B2
(45) Date of Patent: Jan. 31, 2012

(54) SWITCHING REGULATION CIRCUIT AND DUAL-WINDING MOTOR APPARATUS

(75) Inventors: Hsuan-Chuan Chen, Jhubei (TW); Teng-Tsai Lin, Jhubei (TW)

(73) Assignee: Feeling Technology Corp., Jhubei City, Hsinchu County (TW)

( * ) Notice: Subject to any disclaimer, the term of this patent is extended or adjusted under 35 U.S.C. 154(b) by 658 days.

(21) Appl. No.: 12/185,318

(22) Filed: Aug. 4, 2008

(65) Prior Publication Data

US 2009/0257740 A1    Oct. 15, 2009

(30) Foreign Application Priority Data

Apr. 14, 2008    (TW) ................................ 97113485 A (51) Int. Cl.
*H02P 6/06* (2006.01)
(52) U.S. Cl. ......... 318/400.06; 318/400.26; 318/400.27; 318/400.29; 318/721
(58) Field of Classification Search .................. 257/372; 318/797, 297, 400.01, 400.33, 400.34, 400.06, 318/400.1, 400.12, 400.14, 400.26, 400.27, 318/400.29, 721, 801
See application file for complete search history.

(56) References Cited

U.S. PATENT DOCUMENTS

| | | | | |
|---|---|---|---|---|
| 5,808,451 A * | 9/1998 | Endou et al. | ............. | 322/24 |
| 5,982,133 A * | 11/1999 | Murakami et al. | ............. | 318/650 |
| 6,046,554 A * | 4/2000 | Becerra | ............. | 318/400.34 |
| 7,026,773 B2 * | 4/2006 | Petersen | ............. | 318/400.01 |
| 7,122,980 B2 * | 10/2006 | Kuroshima et al. | ...... | 318/400.11 |
| 7,239,098 B2 * | 7/2007 | Masino | ............. | 318/400.35 |
| 7,288,910 B2 * | 10/2007 | Dooley | ............. | 318/400.21 |
| 7,429,840 B2 * | 9/2008 | Pollock et al. | ............. | 318/254.1 |
| 7,509,032 B2 * | 3/2009 | Jami | ............. | 388/811 |
| 7,554,279 B2 * | 6/2009 | Loffler et al. | ............. | 318/400.07 |
| 7,880,427 B2 * | 2/2011 | Foll et al. | ............. | 318/811 |
| 7,893,638 B2 * | 2/2011 | Akama et al. | ............. | 318/400.14 |

FOREIGN PATENT DOCUMENTS

WO    2006/089605 A1    8/2006

OTHER PUBLICATIONS

Taiwan Office Action mailed Aug. 4, 2011.
English translation by machine of Taiwan Office Action mailed Aug. 4, 2011.

* cited by examiner

*Primary Examiner* — Walter Benson
*Assistant Examiner* — Antony M Paul
(74) *Attorney, Agent, or Firm* — Thomas, Kayden, Horstemeyer & Risley, LLP (57) ABSTRACT

A switching regulation circuit for a dual-winding motor apparatus is provided. The switching regulation circuit comprises a gate-controlled device and a driving circuit. When one of the two windings generates an induced voltage signal greater than a threshold value, the driving circuit generates an output signal for turning on the gate-controlled transistor. Thereby, a parasitic diode of the gate-controlled device will not be turned on and damage the entire circuit.

8 Claims, 6 Drawing Sheets

SWITCHING REGULATION CIRCUIT AND DUAL-WINDING MOTOR APPARATUS

This application claims the benefit of priority based on Taiwan Patent Application No. 097113485, filed on Apr. 14, 2008, the contents of which are incorporated herein by reference in their entirety.

CROSS-REFERENCES TO RELATED APPLICATIONS

Not applicable.

BACKGROUND OF THE INVENTION

1. Field of the Invention

The present invention provides a circuit for a dual-winding motor apparatus. In particular, the invention provides a switching regulation circuit that may prevent malfunction during operation.

2. Descriptions of the Related Art

Figure 1:
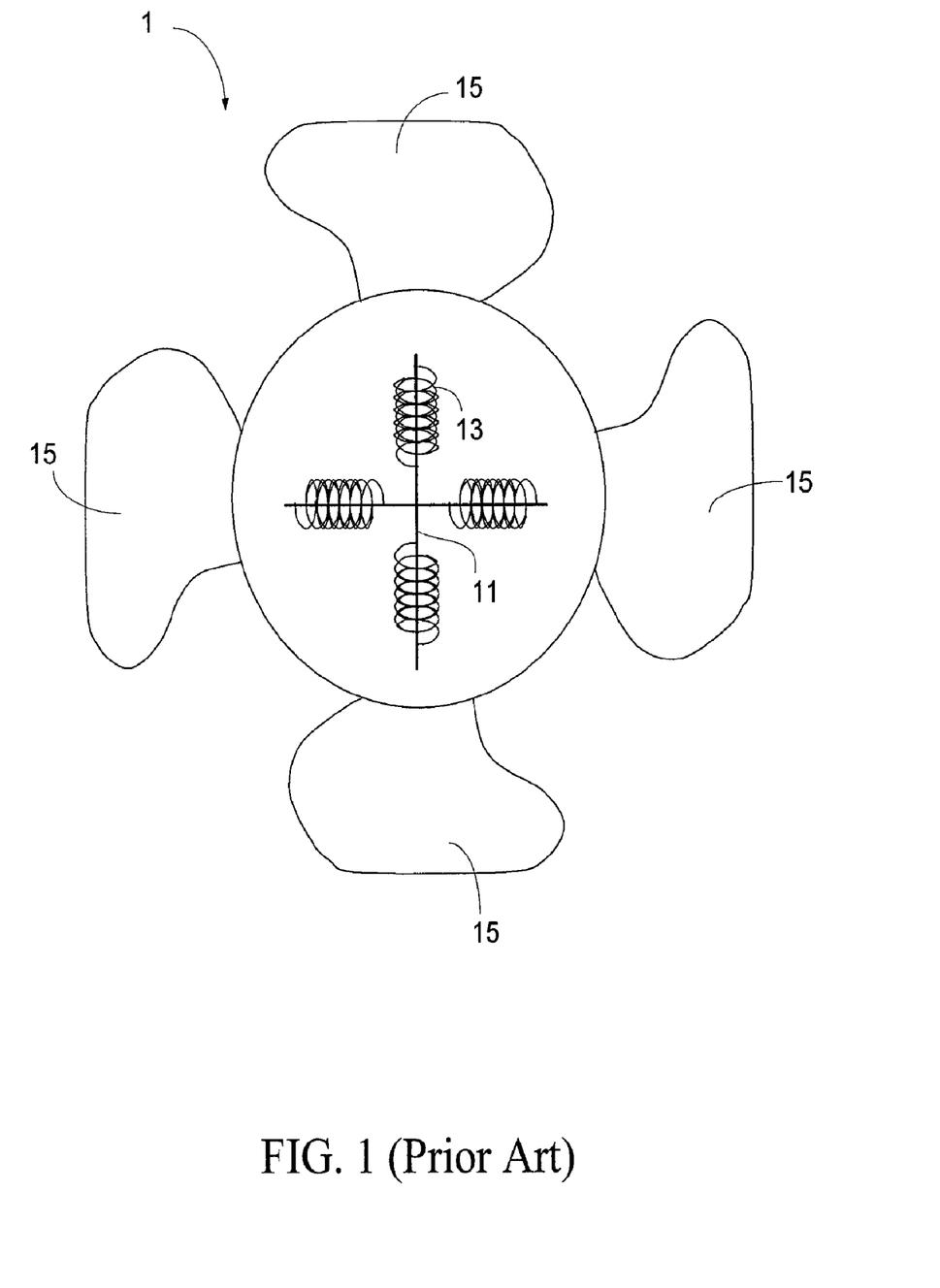
FIG. 1 is a schematic view of a dual-winding motor apparatus of the prior art.
Figure 2:
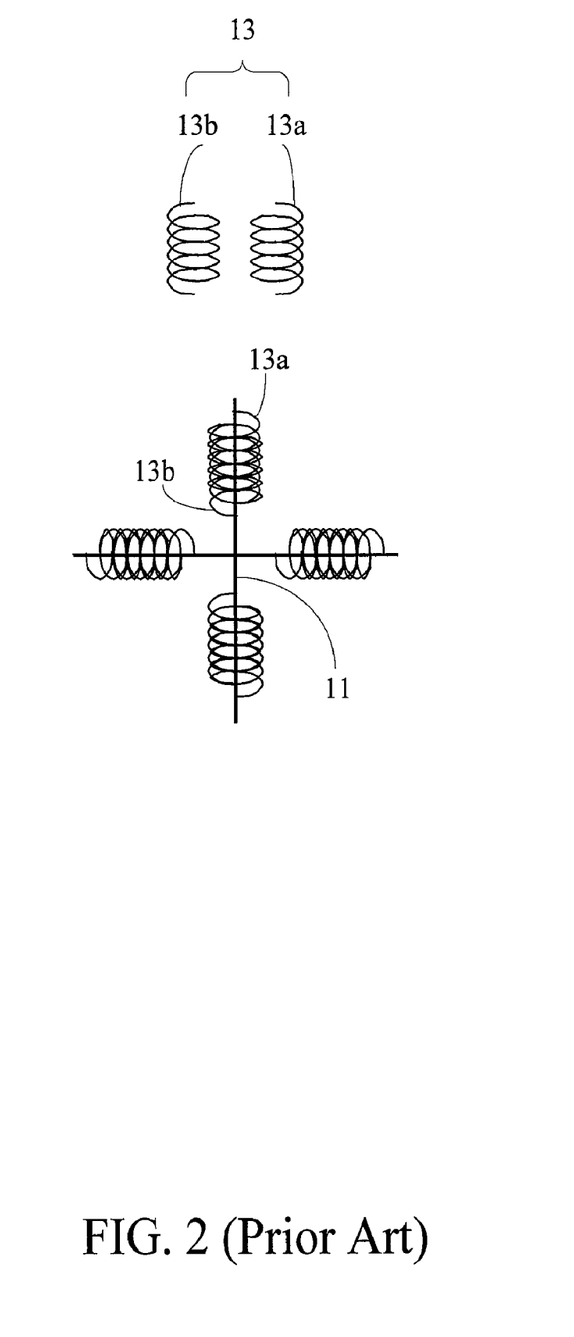
FIG. 2 is a schematic view illustrating a manner in which the dual-winding of the prior art is wound.

Various electronic products generate large amounts of heat due to the thermal effect of the electric current during the operation of internal circuits. Accordingly, a fan motor is needed to dissipate heat during the operation of the circuits. One apparatus commonly used to control the fan motor is the dual-winding motor apparatus. FIG. 1 depicts a schematic view of a dual-winding motor apparatus 1, which operates under the following principle. A current is fed to the winding of a dual-winding assembly 13 wound on a stator 11 of the dual-winding motor apparatus 1. The magnetomotive force generated between the winding and a rotor drives the fan 15 to rotate. Here, the dual-winding assembly 13 on the same stator 11 is wound in such a manner that one winding 13a is spirally wound in a clockwise direction from top to bottom, while the other winding 13b is spirally wound in a counterclockwise direction from top to bottom, as depicted in FIG. 2.

Figure 3:
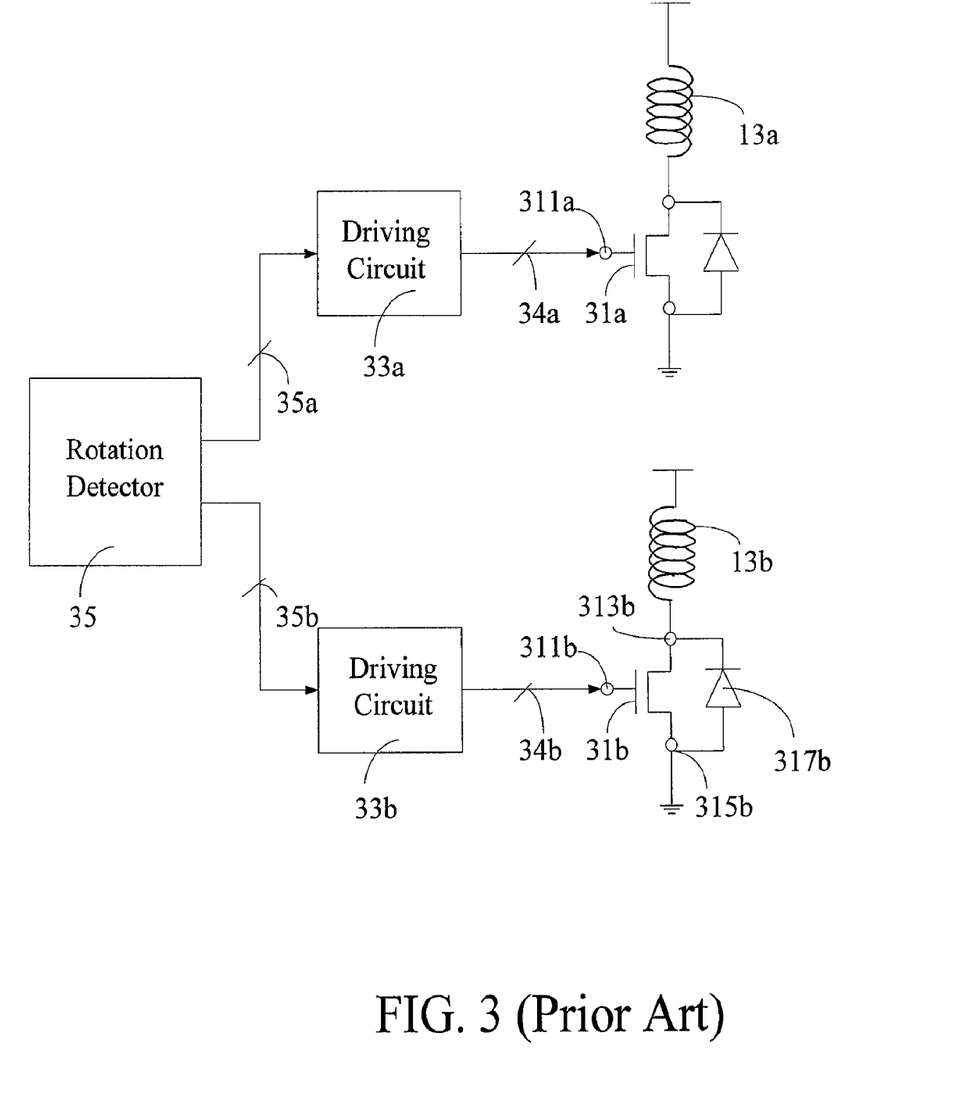
FIG. 3 is a schematic view illustrating the process for driving the fan motor of the prior art.

In reference to FIG. 3, a circuit used for rotating the fan 15 of the dual-winding motor apparatus 1 is depicted therein. Upon detecting the rotational position of a rotor, the rotation detector 35 sends a signal 35a to a driving circuit 33a, which then outputs a detection signal 34a to the gate 311a of a gate-controlled device 31a. Alternatively, the rotation detector 35 sends a signal 35b to the driving circuit 33b, which then outputs a detection signal 34b to the gate 311b of a gate-controlled device 31b. Generally, each of the gate-controlled devices is an N-type metal-oxide-semiconductor field effect transistor (N-type MOSFET), which will be used as an example in the following description. To facilitate the descriptions of the related art, an example where one winding 13b of the dual-winding assembly experiences a variation in the flux of the other winding 13a will be described herein. When a negative voltage is induced across the winding 13b, the induced current flows from the drain 313b of the gate-controlled device to the winding 13b. When the negative voltage is greater than the threshold voltage of a parasitic diode 317b, the parasitic diode 317b is subjected to a forward bias and thus, is turned on. Consequently, the charge carriers flow into a P-type substrate of the gate-controlled device 31b, causing an adverse effect on the normal operation of the circuit, and leading to the malfunction of the circuit of the gate-controlled device 31b. Furthermore, this may lead to a CMOS latch-up effect, causing permanent damage to the driving circuit. Likewise, when the winding 13a experiences a variation of flux of the winding 13b, the same problem arises as well, and will not be further described herein.

Figure 4:
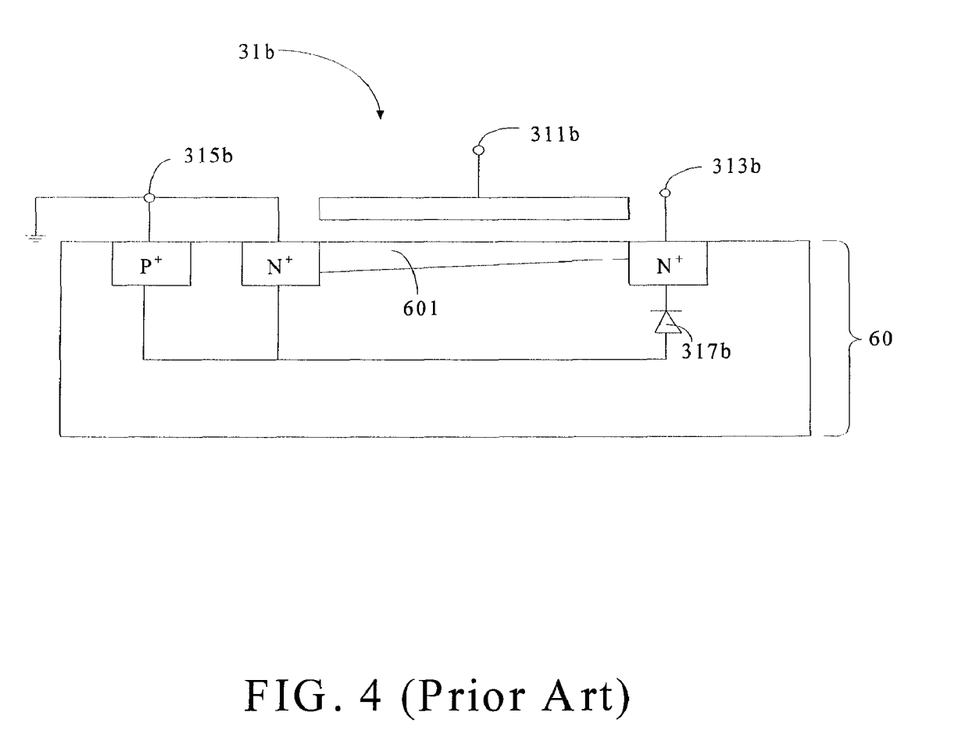
FIG. 4 is a schematic cross-sectional view of a gate-controlled device.

FIG. 4 illustrates a schematic cross-sectional view of the gate-controlled device 31a or 31b. Because the gate-controlled devices 31a, 31b are the same in structure, only the gate-controlled device 31b will be described as an example hereinbelow. When the gate 311b of the gate-controlled device 31b is turned off, the current is not allowed to flow between the drain 313b and the source 315b. In the substrate 60 of the gate-controlled device 31b, there is a parasitic diode 317b which is electrically connected to the drain 313b at one end and electrically connected to the source 315b at the other end. However, when a negative voltage is induced at the drain 313b by the mutual induction effect of the winding 13b and causes a forward bias exceeding the threshold voltage of the parasitic diode 317b, the parasitic diode 317b will be turned on. If the current flowing through the parasitic diode 317b carries an excessive amount of charge carriers or an excessively high energy, excessive electrons will be found in the substrate 60, which may cause malfunction during the operation of the circuit and thus impair performance of the whole circuit.

To overcome the aforesaid shortcoming, a solution has been proposed and widely adopted in the semiconductor industry. According to this solution, a guard ring is designed in the P-type substrate of the N-type MOSFET 31 to capture or collect the charge carriers injected into the P-type substrate to avoid the latch-up effect and consequent malfunction of the circuit. Unfortunately, when the energy or amount of charge carriers injected into the P-type substrate is excessively high, the guard ring is unable to completely capture or collect the charge carriers, thus leading to the latch-up effect.

In view of this, it is highly desirable in the art to avoid degradation in the performance of the circuit due to unexpected charge migration caused by a turned-on parasitic element.

SUMMARY OF THE INVENTION

One objective of this invention is to provide a switching regulation circuit for a dual-winding motor apparatus. The switching regulation circuit comprises a gate-controlled device and a driving circuit. The dual-winding motor apparatus comprises a first winding, a second winding and a supply rail, wherein the first winding and the second winding alternately conduct a current. The dual-winding motor apparatus generates an induced voltage signal that represents an induced voltage of the second winding when the second winding has not yet conducted a current. Accordingly, when the induced voltage signal is greater than a threshold signal, the gate-controlled device is turned on by the driving circuit to prevent malfunction of the gate-controlled device during the operation of the circuit.

The gate-controlled device has a gate thereof coupled to the driving circuit, and has the other two electrodes coupled to the second winding and a ground end of the supply rail respectively. The driving circuit is configured to detect the rotational position of a rotor of the dual-winding motor apparatus to generate a detection signal, and is configured to switch the gate-controlled device in response to the detection signal and the induced voltage signal. When the gate-controlled device has been turned off by the driving circuit in response to the detection signal, the gate-controlled device is further configured to be turned on by the driving circuit in response to the induced voltage signal while the induced voltage signal is greater than the threshold value.

Another objective of this invention is to provide a dual-winding motor apparatus. The dual-winding motor apparatus comprises the following components: a rotor and a stator, in which the rotor rotates relatively to the stator that is not moving; a first winding and a second winding alternatively conducting a current, in which the second winding generates an induced voltage signal when the first winding conducts current and the second winding has not yet conducted current; a gate-controlled device with three electrodes, two of which are coupled to the second winding and a ground end of a supply rail respectively; and a driving circuit that is coupled to the gate of the gate-controlled device, wherein the driving unit is configured to detect the rotational position of the rotor to generate a detection signal and configured to switch the gate-controlled device in response to the detection signal and the induced voltage signal. More specifically, when the second winding generates the induced voltage signal being greater than a threshold value, the gate-controlled device is turned on in response to the detection signal and the induced voltage signal being greater than the threshold value. With this arrangement, it is possible to prevent malfunction of the circuit due to mutual induction when the first and the second windings alternately conduct a current, which would otherwise adversely affect the rotation of the rotor.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. However, these embodiments are not intended to limit this invention to any specific environment, applications or particular implementations described in these embodiments. Therefore, description of these embodiments is only intended to illustrate rather than to limit this invention. It should be appreciated that, in the following embodiments and the attached drawings, elements not related directly to this invention are omitted from depiction.

Figure 5:
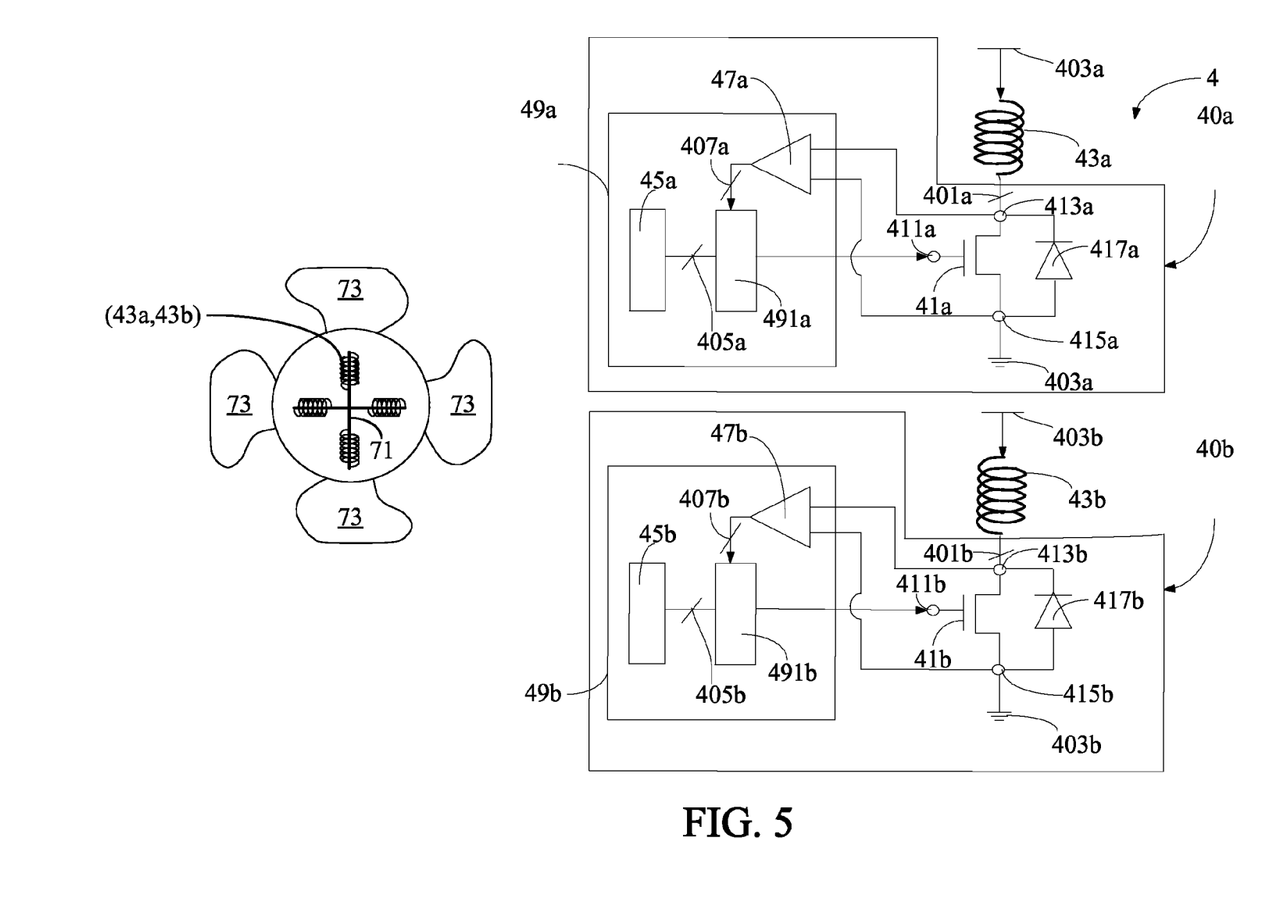
FIG. 5 is a schematic view of a switching regulation circuit of a dual-winding motor apparatus.

The preferred embodiment of this invention is depicted in FIG. 5, which primarily illustrates switching regulation circuits 40a, 40b of a dual-winding motor apparatus 4. Each of the switching regulation circuits 40a, 40b comprises a gate-controlled device 41a (41b) and a driving circuit 49a (49b) respectively. The switching regulation circuits 40a, 40b are identical to each other in terms of the connection between the individual components and functionalities. The switching regulation circuits 40a, 40b are coupled to a first winding 43a and a second winding 43b. Primarily, the dual-winding motor apparatus 4 further comprises a rotor 73 and a stator 71 in addition to the first winding 43a and the second winding 43b. The first winding 43a and the second winding 43b are wound in opposite directions at the same position of the dual-winding motor apparatus and, in this embodiment, are wound at the same position of the stator 71. For example, one of the two windings is spirally wound from top to bottom in a clockwise direction, while the other is spirally wound from top to bottom in a counterclockwise direction. In FIG. 5, the first winding 43a and the second winding 43b are depicted at different positions for convenience of describing the operation of the circuit. The first winding 43a and the second winding 43b alternately conduct a current upon receiving the power supply from a supply rail 403a and supply rail 403b respectively. The rotor 73 then rotates relative to the stator 71. It should be appreciated that the switching regulation circuit of this invention is used for a motor apparatus with two windings wound at the same position. However, in other similar embodiments, the first winding and the second winding may also be wound on the rotor 73 to alternately conduct a current, and this is also applicable to this invention.

Furthermore, when a current is fed by the supply rail 403a to the first winding 43a, an induced voltage signal will be obtained across the second winding 43b due to the mutual induction effect. This induced voltage signal represents an induced voltage of the winding that has not conducted a current yet. To illustrate this invention more clearly, an example where the second winding 43b of the switching regulation circuit is not conducting a current and experiences mutual induction from a current conducted by the first winding 43a will be described hereinbelow. The switching regulation circuit 40a is identical to the switching regulation circuit 40b in terms of connections and functionalities, and thus will not be further described herein. It shall also be appreciated that identical numerals refer to identical components in the switching regulation circuits 40a and 40b. For example, the gate-controlled device 41a and the gate-controlled device 41b are identical to each other.

The gate-controlled device 41b is coupled to the second winding 43b and the supply rail 403b. In this embodiment, the supply rail 403b is at a ground level, i.e., at the minimum voltage level of the switching regulation circuit 40b. To illustrate the operation of the switching regulation circuit 40b more clearly, an example where the gate-controlled device 41b is an N-type metal-oxide-semiconductor field-effect transistor (N-type MOSFET) will be described. The gate-controlled device 41b has a gate 411b, a drain 413b and a source 415b. The gate 411b is coupled to the driving circuit 49b, the drain 413b is coupled to the second winding 43b, and the source 415 is coupled to a ground end of the supply rail 403b.

The driving circuit 49b comprises a rotation detector 45b, a comparator 47b and a controller 491b. The rotation detector 45b is configured to generate a detection signal 405b in response to the rotation of the rotor 73. Because the rotor 73 generally has a magnetic property, the rotation detector 45b may be implemented as a magnetic detector, which detects the rotational position of the rotor 73 of the dual-winding motor apparatus 4 to generate a detection signal 405b. Then, the driving circuit 49b switches the gate-controlled device 41b in response to the detection signal 405b and the induced voltage signal 401b. The driving circuit 49a switches the gate-controlled device 41a, and if the gate-controlled device 41a is turned off, a change will occur in the induced voltage signal 401b because of the mutual induction effect. When the induced voltage signal 401b becomes greater than the threshold value, the gate-controlled device 41b will be turned on by the driving circuit 49b to prevent the parasitic diode 417b from being turned on.

Furthermore, the comparator 47b of the driving circuit 49b is configured to compare the induced voltage signal 401b with the threshold value to generate an output signal 407b when the induced voltage signal 401b is greater than the threshold value. Upon receiving the output signal 407b, the controller 491b generates a driving signal to the gate-controlled device 41b to turn on the gate-controlled device 41b, i.e., the N-type MOSFET. It should be appreciated that, since the threshold is used as a reference value for the comparator 47b, the value of the threshold is neither limited to any specific value nor intended to limit the scope of this invention. In this embodiment, the threshold value is preferably a zero voltage level, while the comparator 47b is a negative voltage comparator. When the induced voltage signal 401b is at a negative voltage level, the comparator 47b generates the output signal 407b which is adapted to enable the driving circuit 49b to turn on the gate-controlled device 41b. In other embodiments, the comparator 47b is not merely limited to the negative voltage comparator, but may be a positive voltage comparator; the operation of which will be appreciated by those skilled in the circuit industry and thus will not be further described herein. Similarly, the comparator 47a of this embodiment may also be a negative comparator. How the comparator 47a, 47b generate the output signal 407b according to the threshold value will be described in detail hereinafter.

Figure 6:
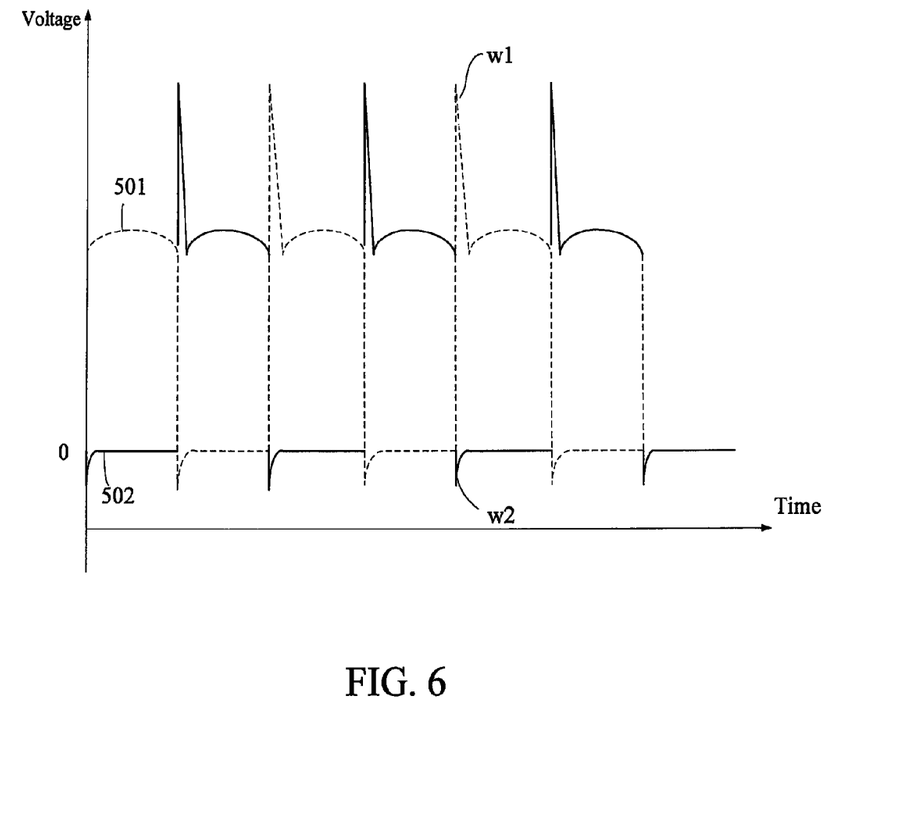
FIG. 6 is a waveform diagram illustrating the variation of voltage across a drain and a source of the gate-controlled device during the operation of the switching regulation circuit.

As shown in FIG. 6, the variation of the voltage between the drain 413a and the source 415a of the gate-controlled device 41a as well as that of the voltage between the drain 413b and the source 415b of the gate-controlled device 41b during the operation of the switching regulation circuits 40a, 40b are depicted therein. The dashed waveform 501 in FIG. 5 represents the variation of the voltage between the drain 413a and the source 415a of the gate-controlled device 41a in the first winding 13a, while the solid waveform 502 represents the variation of the voltage between the drain 413b and the source 415b of the gate-controlled device 41b in the second winding 13b. As described above, when the gate-controlled device 41a coupled with the first winding 43a is to be turned off, a positive peak voltage w1 arises between the drain 413a and the source 415a thereof. At this point, an induced voltage signal 401b is generated across the second winding due to the mutual induction effect; that is, a negative voltage w2 is generated between the drain 413b and the source 415b of the gate-controlled device 41b.

As described above, in response to the negative voltage w2, the comparator 47b generates the output signal 407b which enables the driving circuit 49b to turn on the gate-controlled device 41b. Likewise, the comparator 47a operates under the same principle as well and thus will not be further described herein. Because the voltage across the gate-controlled device 41a attenuates gradually from the positive peak value w1, the negative voltage w2 of the gate-controlled device 41b also returns to the zero voltage level gradually. At this point, the current begins to flow through the second winding 43b, and when the gate-controlled device 41b is turned off, an induced voltage signal 401a is generated across the first winding as described above. In this way, the first winding 43a and the second winding 43b are allowed to conduct the current alternately.

In this embodiment, a comparator 47b is used to detect the voltage variation between the drain 413b and the source 415b of the gate-controlled device 41b. Once a negative voltage arises between the drain 413b and the source 415b, the comparator 47b generates the output signal 407b which enables the driving circuit 49b to turn on the gate 411b of the gate-controlled device 41b. More specifically, because the parasitic diode 417b can withstand a voltage substantially ranging from 0.6V to 0.7V, the voltage difference that is detected by the comparator 47b between the drain 413b and the source 415b may be set to be smaller than 0.6V~0.7V, and typically set to be 0.1V~0.2V. Accordingly, in case the comparator 47b detects a voltage difference of 0.1V~0.2V between the drain 413b and the source 415b, an output signal 407b will be outputted to instruct the driving circuit 49b to turn on the gate 411b of the gate-controlled device 41b. Then, a current flows from the source 415 through the passage 601 of the gate-controlled device 41b towards the drain 413a, thus pulling the negative voltage w2 back to the zero voltage level. As a result, when the charge carriers flow from the source 415b through the passage of the gate-controlled device 41b to the drain 413b, there is no unexpected charge carrier migration caused by turning on the parasitic diode.

In summary, by providing a switching regulation circuit for use in a dual-winding motor apparatus, the unexpected charge migration in the substrate caused by turning on the parasitic diode is prevented when the first winding and the second winding of the dual-winding motor apparatus provide alternate conductions that result in a negative voltage.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A switching regulation circuit for a dual-winding motor apparatus, the dual-winding motor apparatus comprising a first winding, a second winding and a supply rail, the first winding and the second winding being wound in adverse directions at a same position of the dual-winding motor apparatus, and alternately conducting a current, the dual-winding motor apparatus generating an induced voltage signal that represents an induced voltage of the second winding when the second winding has not yet conducted a current, the switching regulation circuit comprising:

a gate-controlled device, having a gate, a drain and a source, the drain being coupled to the second winding, and the source being coupled to a ground end of the supply rail; and a driving circuit, comprising a negative-voltage comparator, the driving circuit being coupled to the gate and configured to detect the dual-winding motor apparatus with a rotational position of a rotor thereof to generate a detection signal, the negative-voltage comparator being configured to compare the induced voltage signal with a threshold value having a zero voltage level;

wherein when the gate-controlled device has been turned off by the driving circuit in response to the detection signal, the negative-voltage comparator generates an output signal to turn on the gate-controlled device while the induced voltage signal is smaller than the zero voltage level.

2. The switching regulation circuit as claimed in claim 1, wherein the gate-controlled device is a N-type metal-oxide-semiconductor field transistor (N-type MOSFET).

3. The switching regulation circuit as claimed in claim 1, wherein the driving circuit further comprises a rotation detector being configured to detect the rotational position of the rotor of the dual-winding motor apparatus for generating the detection signal.

4. The switching regulation circuit as claimed in claim 3, wherein the rotation detector is a magnetic field detector being configured to detect a variation of magnetic field caused by rotation of the rotor of the dual-winding motor apparatus to generate the detection signal.

5. A dual-winding motor apparatus, comprising:
a rotor and a stator, in which the rotor rotates relatively to the stator;
a first winding and a second winding being wound in adverse directions at a same position of the dual-winding motor apparatus, and alternatively conducting a current, the second winding generating an induced voltage signal when the first winding conducts current and the second winding has not yet conducted a current;
a supply rail;
a gate-controlled device, having a gate, a drain and a source, the drain being coupled to the second winding, and the source being coupled to a ground end of the supply rail; and
a driving circuit, comprising a negative-voltage comparator, the driving circuit being coupled to the gate and configured to detect the dual-winding motor apparatus with a rotational position of a rotor thereof to generate a detection signal, the negative-voltage comparator being configured to compare the induced voltage signal with a threshold value having a zero voltage level;
wherein when the gate-controlled device has been turned off by the driving circuit in response to the detection signal, the negative-voltage comparator generates an output signal to turn on the gate-controlled device while the induced voltage signal is smaller than the zero voltage level.

6. The dual-winding motor apparatus as claimed in claim 5, wherein the gate-controlled device is a N-type metal-oxide-semiconductor field transistor (N-type MOSFET).

7. The dual-winding motor apparatus as claimed in claim 5, wherein the driving circuit further comprises a rotation detector being configured to detect the rotational position of the rotor of the dual-winding motor apparatus for generating the detection signal.

8. The dual-winding motor apparatus as claimed in claim 7, wherein the rotation detector is a magnetic field detector being configured to detect a variation of magnetic field to generate the detection signal when the rotor rotates.

* * * * *